United States Patent [19]

Onaya et al.

[11] Patent Number: 4,475,842
[45] Date of Patent: Oct. 9, 1984

[54] CORROSION RESISTANT SHAFT AND BOSS CLAMPING DEVICE

[75] Inventors: Mamoru Onaya, Toyonaka; Hitoshi Chiba, Takatsuki; Toshihiro Hosokawa, Toyonaka, all of Japan

[73] Assignee: Tsubakimoto Chain Company, Osaka, Japan

[21] Appl. No.: 359,613

[22] Filed: Mar. 18, 1982

[30] Foreign Application Priority Data

May 18, 1981 [JP] Japan ............................... 56-70495[U]

[51] Int. Cl.³ .............................................. F16D 1/06
[52] U.S. Cl. ..................................... 403/370; 403/371
[58] Field of Search ............... 403/366, 367, 368, 370, 403/371

[56] References Cited

U.S. PATENT DOCUMENTS 3,847,495  2/1973  Peter et al. ........................... 403/370
4,095,908  3/1977  Schäfer et al. .................... 403/370 X

OTHER PUBLICATIONS

"Definitions of Metallurgical Terms", (© 1977), Amer. Society for Metals, pp. 3, 32, 38, and 34, cited.

Primary Examiner—Richard J. Scanlan, Jr.
Attorney, Agent, or Firm—Steele, Gould & Fried

[57] ABSTRACT

A corrosion resistant shaft and boss clamping device comprises an inner race to be fit over the shaft, an outer race to be fit inside the boss enclosing the shaft and the inner race, the races having wedge-shaped surfaces facing one another, a pair of taper rings having a complementary wedge shape disposable between races, and, bolts adapted to urge the taper rings toward one another, thereby clamping the shaft to the boss. The inner and outer races are expansible and contractable, being made of split rings of austenitic stainless steel. The clamping bolts are made of precipitation hardened stainless steel, and one of the taper rings is provided with a hardened nitrided layer on the surface thereof to be contacted by the clamping surfaces of the clamping bolts.

2 Claims, 4 Drawing Figures

CORROSION RESISTANT SHAFT AND BOSS CLAMPING DEVICE

BACKGROUND OF THE INVENTION

1. Field of the Invention

This invention relates to shaft and boss clamping devices, and in particular to such devices adapted for use in corrosive environments or in food machinery where corrosion is a particular problem.

2. Description of the Prior Art

Shaft and boss clamping devices comprising inner and outer races and a pair of bolted taper rings for wedge-wise forcing the respective races against the shaft and boss are known in the art. Where such devices were formerly used in corrosive environments, the inner and outer races, the pair of taper rings and the clamping bolts have been made of stainless steel to minimize corrosion. Use of stainless steel for these elements, however, has not been completely successful because the stainless steel material, although corrosion resistant, is not sufficiently hard.

In the usual device, each clamping bolt passes through an unthreaded hole in one taper ring and is threadably engaged with the second taper ring. The pair of wedge-shaped taper rings are urged together by rotating the threaded clamping bolts. The clamping surface of the bolts, namely the shoulder surface immediately behind the bolt head, is placed directly against a surface of the unthreaded taper ring, progressively greater force being applied between the clamping surfaces on the bolt and taper ring as the bolts are tightened. Where both the bolts and taper rings are composed of stainless steel, a seizure phenomenon occurs which resists relative movement of the bolt and taper ring clamping surfaces. The seizure prevents the bolts from being further tightened to increase the clamping force. Since the maximum possible clamping force is limited, stainless steel is not used in shaft and boss clamping devices of this type.

Rather than employing stainless steel, the art teaches use of a clamping bolt made of a common steel having an anti-corrosion plating applied thereto. Alternatively, protective grease is applied to the device and the greased area is then covered over. Unfortunately, it is impossible to completely close such a cover. Inevitably, the gas or solution in which the device is used penetrates around the periphery of the cover, or grease escapes to foul the solution. With the lapse of time, the grease deteriorates and/or flows out, so a satisfactory corrosion resistance cannot be indefinitely maintained. Moreover, with food machinery, such grease is unsanitary and even small quantities may affect the taste of the food.

It will therefore be appreciated that the problem of clamping a shaft and boss for food machinery or in a corrosive environment is a difficult one. Use of grease for enhancing corrosion resistance involves substantial drawbacks, and even if an anti-corrosion plating is applied to the bolt, it is impossible to maintain sufficient corrosion resistance over a long period of time. A shaft and boss clamping device that employs the long term corrosion resistance of stainless steel rather than platings or grease has therefore been sorely needed in the art. What has heretofore been lacking in a satisfactory way of avoiding the seizure phenomenon characteristic of stainless steel clamping surfaces.

SUMMARY OF THE INVENTION

It is an object of this invention to provide a shaft and boss clamping device particularly adapted to food machinery and to corrosive environments.

It is also an object of the invention to secure the long term corrosion resistance of stainless steel in a shaft and boss clamping device.

It is another object of the invention to prevent the seizure of clamping surfaces in a stainless steel shaft and boss clamping device.

It is yet another object of the invention to provide a shaft and boss clamping device which is not subject to corrosion and is effective for a long period of time.

These and other objects are accomplished by a corrosion resistant shaft and boss clamping device comprising an inner race to be fit over the shaft, an outer race to be fit inside the boss enclosing the shaft and the inner race, the races having wedge-shaped surfaces facing one another, a pair of taper rings having a complementary wedge shaped disposable between the races, and bolts adapted to urge the taper rings toward one another, thereby clamping the shaft to the boss. The inner and outer races are expansible and contractable, being made of split rings of austenitic stainless steel, and one of the taper rings is provided with a hardened nitrided layer on the surface thereof to be contacted by the clamping surfaces of the clamping bolts.

BRIEF DESCRIPTION OF THE DRAWINGS

There are shown in the drawings the embodiments of the invention which are presently preferred. It should be understood, however, that the invention is not limited to the precise arrangements and instrumentalities depicted.

DESCRIPTION OF THE PREFERRED EMBODIMENTS

Figure 2:
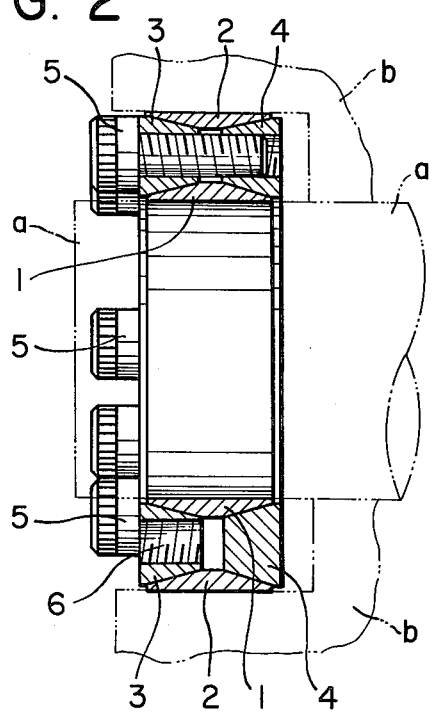
FIG. 2 is a section view taken along line A—A in FIG. 1, shaft "a" and boss "b" shown in broken lines.

The present invention concerns a device for rigidly connecting a shaft and boss. As shown in FIG. 2, shaft "a" is to be joined to boss "b" such that they may be rotated integrally with each other. An annular cavity is formed on an inner surface of boss "b", the boss being fitted over the shaft "a". The clamping device of the invention is fitted into the annular cavity between the shaft and boss and exerts radial pressure inward toward the shaft and outward toward the boss in order to secure the same one to the other.

Figure 1:
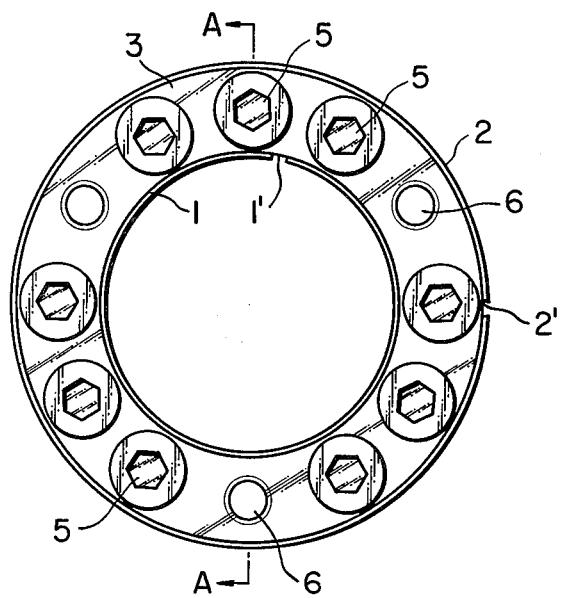
FIG. 1 is a front elevation view of a corrosion resistant shaft and boss clamping device according to the invention.

As shown in FIGS. 1 and 2, the invention comprises an inner race 1 in contact with the shaft, and an outer race 2 in contact with the boss. The inner and outer races conform to the shaft and boss, respectively, along the surfaces in contact therewith. The opposing surfaces of the inner and outer races, namely the surfaces facing one another across the annual cavity, having sloping outer and inner surfaces. The cross-section of each race is therefore in the shape of a truncated triangle. Wedge-shaped tapered surfaces are thereby formed on both an inner and outer side of both the inner and outer races for contact with the taper rings. Taper rings 3 and 4 are shaped to complement the sloping surfaces of races 1 and 2, i.e., sloped at the same angle. The taper rings are urged toward one another by clamping bolts 5, thereby forcing outer race 2 against the boss and inner race 1 against the shaft as the sloped taper rings slide inward over the sloped races.

In order to transmit the radial force exerted by the taper rings, inner and outer races 1 and 2 must be expansible and contractable. As shown in FIG. 1, the inner and outer races are preferably slit axially. Slits 1' and 2' allow the inner and outer races to expand and contract in circumference, and thereby to convey the radial force exerted by the clamping bolts and taper rings.

In the taper ring 3, at least one extracting hole 6 is preferably formed to facilitate removal of the taper rings. With reference to FIG. 2, a bolt is threaded into tapped extracting hole 6 in taper ring 3 to remove the clamping device. As no corresponding hole is provided in taper ring 4, the bolt threaded into hole 6 exerts an axial force against taper ring 4, the axial force in reaction thereto forcing taper ring 3 away from the clamping device. Extracting holes are preferably spaced evenly around the circumference of the taper ring, as shown in FIG. 1. When evenly spaced and employed simultaneously, axial forces release the clamping device and the taper rings are removed easily without damage due to misalignment.

Taper rings 3 and 4 are positioned alike on the inner and outer sides. The taper rings, however, are not symmetrically threaded. With reference to FIG. 2, clamping bolt 5 is threadably connected to taper ring 4. The corresponding bolt hole in taper ring 3 is not threaded. Accordingly, as clamping bolt 5 is tightened by turning in the threads, the taper rings 3, 5 approach each other and are wedged between the inner and outer races to fasten the shaft and the boss strongly wedgewise. The taper rings are removed by inserting a bolt threadedly into the extracting tapped hole 6 formed in one taper ring 3, and pushing against the unthreaded surface of the other taper ring 4 with the bolt.

Figure 3:
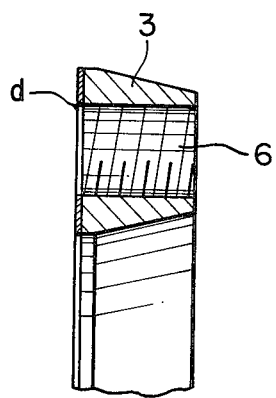
FIG. 3 is a partial section detail view of the taper ring showing a tapped extracting hole; and, FIG. 4 is a side elevation detail view of the clamping bolt.

The clamping bolt 5 is made of a precipitation hardened stainless steel, while the inner and outer races and the taper rings are made of an austenitic stainless steel. As shown in FIG. 3, the invention further comprises a coating layer "d" on the surface of taper ring 3 which will be in direct contact with clamping bolt 5. The coating on clamping surface of taper ring 3 allows the clamping bolt 5 to be tightly forced against taper ring 3, without the surface seizure phenomenon which is characteristic of contacting faces of stainless steel. That is, because of the precipitation hardening process, the clamping bolt 5 is hard; and as a hardened nitrided layer is provided on a surface of the taper ring 3 (which is of low hardness) to be contacted by the clamping surfaces of the clamping bolt 5, the corresponding clamping surfaces of both the clamping bolt 5 and the taper ring 3 become hardened. Consequently, even when the clamping torque of the clamping bolt 5 is made large, the bolt 5 can be turned tightly without seizure phenomenon. Thus, the clamping force of the bolt can be made large, and accordingly, the degree of force fastening the taper rings 3 and 4 together becomes large in proportion thereto, thereby effecting strong clamping.

Figure 4:
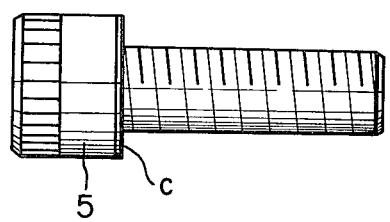

If the clamping surface of clamping bolt 5 is provided, as shown in FIG. 4, with a coating layer "c" comprising molybdenum disulfide, the coefficient of friction of the surface can be reduced. This means that the bolt 5 can revolve over a greater span for the same clamping torque making the clamping force of the bolt even larger, thereby holding the taper rings 3 and 4 together with a much stronger force.

It will be understood that as the shaft and the boss are joined together by using the inner race 1, the outer race 2 and the taper rings 3, 4, and by tightening the clamping bolt 5 into the clamping hole of the taper rings, the disclosed coatings "c", "d" allow a greater force to be exerted urging taper rings 3 and 4 toward one aother. Clamping bolt 5 is not prevented from rotating with respect to the taper ring by a seizure phenomenon between the clamping surfaces of the bolts and taper ring 3. The clamping effect thereby obtainable is far superior to that of conventional shaft and boss clamping devices of plain stainless steel. If desired, only the clamping surface of taper ring 3 may be coated. For best results it is presently preferred that the two coatings as described above be used together on the respective clamping surfaces.

Notwithstanding the improved clamping effect, the present device is also corrosion resistant. Inasmuch as, except for the coatings, the component materials are stainless steel, the clamping device has superior corrosion resistance and a prolonged service life. Unlike prior art devices, the clamping device does not tend to corrode, and no grease or other lubricant is required for protection or to ensure ease of mounting and removal. The device is therefore useful in corrosive environments as well as in food processing machinery or other machinery in which rusting and corrosion are particular problems.

The present invention is applicable not only to clamping a shaft and boss, but also to other clamping functions using stainless steel elements. The characteristic phenomenon of stainless steel seizing a facing surface of stainless steel when tightly placed in contact is substantially avoided.

Various other embodiments of the invention are possible and will now be apparent to those skilled in the art. Reference should be made to the appended claims rather than the foregoing specification as indicating the true scope of the subject invention.

What is claimed is:

1. A corrosion resistant shaft and boss clamping device of the type having an inner race fitted over an outer periphery of the shaft, an outer race fitted over an inner periphery of the boss, said inner and outer races being expansible and contractable, a pair of wedge-shaped tapered surfaces being formed on an outer face of said inner race and on an inner face of said outer race, a pair of taper rings disposed between said inner and outer races, the taper rings having wedge-shaped surfaces complementary to said inner and outer races, and, a plurality of clamping bolts for urging said taper rings toward one another, each of the bolts threadably engaging one of the taper rings and having clamping surfaces for engaging the other of the taper rings, the bolts operable to clamp said shaft and said boss together, the improvement comprising:

said inner and outer races and said pair of taper rings being made of austenitic stainless steel, said plurality of clamping bolts being made of a precipitation hardened stainless steel, and one of said taper rings having a hardened nitrided layer on a surface thereof to be contacted by the clamping surfaces of the clamping bolts, the austenitic stainless steel of the taper rings and precipitation hardening and nitriding of the stainless steel bolts and stainless steel taper rings preventing seizing between abutting stainless steel clamping surfaces of said device.

2. A device according to claim 1, wherein a coating layer comprising molybdenum disulfide is formed on the clamping surfaces of the clamping bolts.

* * * * *